(12) United States Patent
Bradley et al.

(10) Patent No.: US 7,126,440 B2
(45) Date of Patent: Oct. 24, 2006

(54) MODULAR FREQUENCY DIVISION FILTER

(75) Inventors: Paul D. Bradley, Menlo Park, CA (US); Michael L. Frank, Los Gatos, CA (US); Shen Ye, Cupertino, CA (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 165 days.

(21) Appl. No.: 10/899,556

(22) Filed: Jul. 26, 2004

(65) Prior Publication Data
US 2006/0017522 A1    Jan. 26, 2006

(51) Int. Cl.
*H03H 9/70* (2006.01)
*H01P 1/213* (2006.01)
(52) U.S. Cl. .................. 333/133; 333/126; 333/129; 455/78; 455/82
(58) Field of Classification Search ............... 333/126, 333/129, 132, 133; 455/78, 82
See application file for complete search history.

(56) References Cited
U.S. PATENT DOCUMENTS

| | | | | |
|---|---|---|---|---|
| 5,386,203 A | * | 1/1995 | Ishihara | 333/129 |
| 5,652,599 A | * | 7/1997 | Pitta et al. | 343/858 |
| 5,815,804 A | * | 9/1998 | Newell et al. | 455/78 |
| 6,249,687 B1 | * | 6/2001 | Thomsen et al. | 455/553.1 |
| 6,662,021 B1 | * | 12/2003 | Kang et al. | 455/553.1 |
| 6,694,129 B1 | * | 2/2004 | Peterzell et al. | 455/76 |
| 6,724,278 B1 | * | 4/2004 | Smith | 333/133 |
| 6,759,924 B1 | * | 7/2004 | Sakuragawa et al. | 333/133 |
| 6,845,231 B1 | * | 1/2005 | Frank | 455/88 |
| 6,911,708 B1 | * | 6/2005 | Park | 257/416 |
| 6,980,067 B1 | * | 12/2005 | Forrester et al. | 333/133 |
| 6,995,630 B1 | * | 2/2006 | Satoh et al. | 333/133 |

* cited by examiner

*Primary Examiner*—Barbara Summons

(57) ABSTRACT

The present invention is a modular frequency division filter having an antenna port that connects to two or three transmission paths. Each transmission path includes either a band pass filter or a duplexer to separate the received signal by frequency. Frequency phase shifters or shunt inductors may be included to further enhance the frequency separation. Following frequency separation, the separated signal is transceived by a device operating at the respective separated frequency.

12 Claims, 12 Drawing Sheets

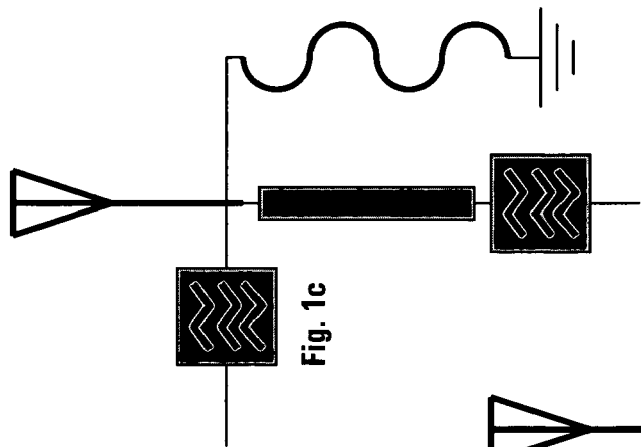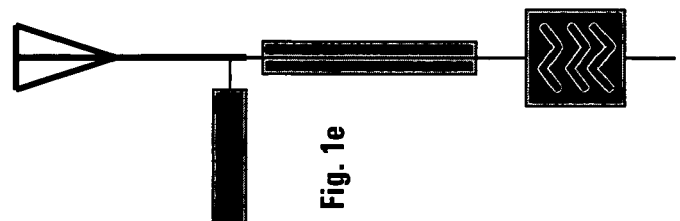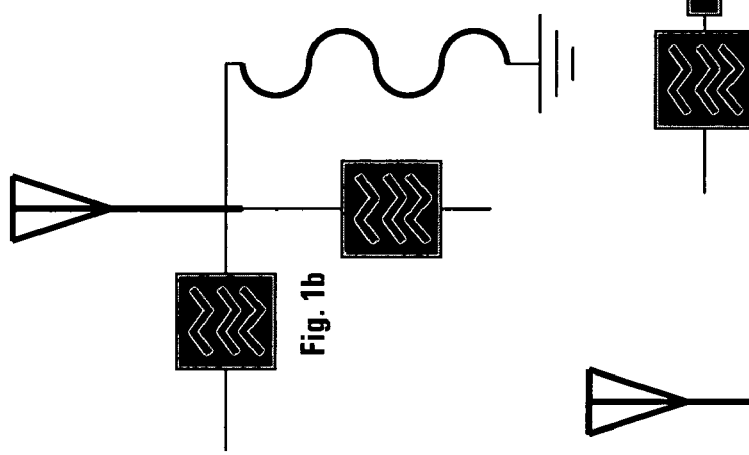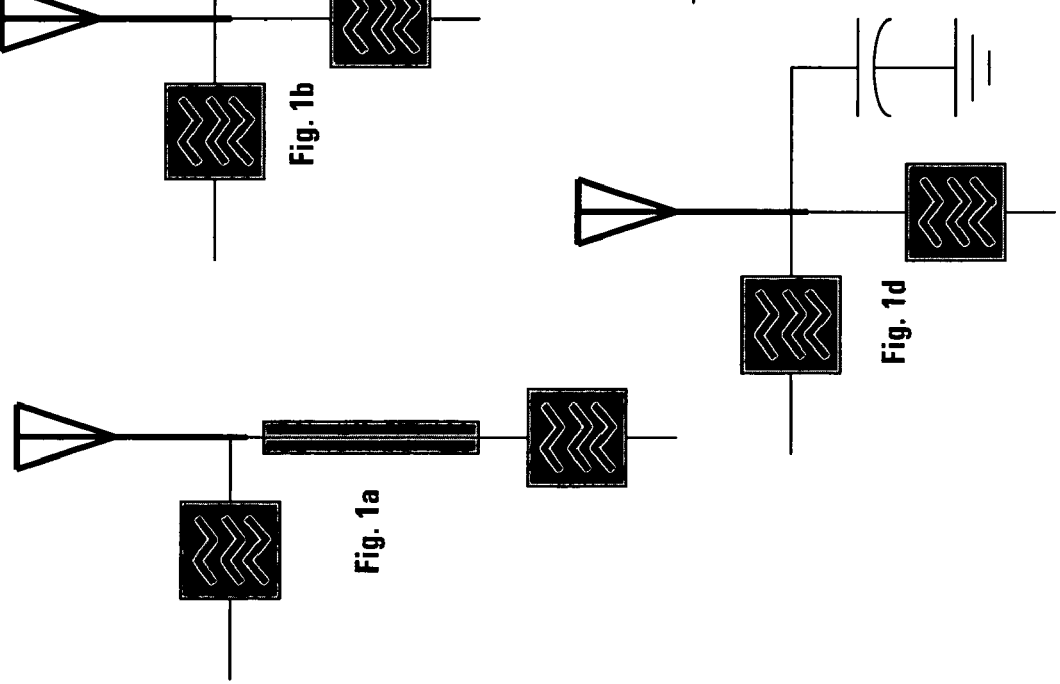
PRIOR ART

MODULAR FREQUENCY DIVISION FILTER

BACKGROUND

Cellular phones (handsets) are increasing in complexity as handsets incorporate more types of service. In most of the world, the trend is for a handset to work with numerous frequency division transceivers as well as time division transceivers. Handsets will combine both radio bands designed for high speed handovers from cell site to cell site, as well as fixed stations such as wireless local area networks (WLAN). There are also location services, e.g. Global Positioning Satellite (GPS), which require support from the handsets. Depending upon requirements, these functions can be separated using switches, separate antennas, filters, or some combination of these.

These bands can be global, e.g. GPS and Industrial Scientific Medical (ISM) bands, or can be regional, e.g. PCS and DCS. Table 1 details some of the frequencies of interest. TABLE-US-00001 TABLE 1 Standard Use Frequencies Cellular Band (US) Cellular Phone 824 to 849 MHz Transmit voice and data 869 to 894 MHz Receive EGSM (non-US) Cellular Phone 880 to 915 MHz Transmit voice and data 925 to 960 MHz Receive GPS (global) Location 1575.42 MHz (L1) & service 1227.60 MHz (L2) DCS (non-US) Cellular Phone 1710 to 1785 MHz Transmit voice and data 1805 to 1880 MHz Receive PCS (US) Cellular Phone 1850 to 1910 MHz Transmit voice and data 1930 to 1990 MHz Receive UMTS (non-US) Cellular Phone 1920 to 1980 MHz Transmit voice and data 2110 to 2170 MHz Receive ISM (worldwide) Fixed data links, Portions of 902 to 928 MHz, with transmit and 2400 to 2500 MHz (ISM b/g), receive at the & 5000 to 6000 MHz (ISM a) same frequencies.

TABLE 1

| Standard | Use | Frequencies |
| --- | --- | --- |
| Cellular Band (US) | Cellular Phone voice and data | 824 to 849 MHz Transmit 869 to 894 MHz Receive |
| EGSM (non-US) | Cellular Phone voice and data | 880 to 915 MHz Transmit 925 to 960 MHz Receive |
| GPS (global) | Location service | 1575.42 MHz (L1) & 1227.60 MHz (L2) |
| DCS (non-US) | Cellular Phone voice and data | 1710 to 1785 MHz Transmit 1805 to 1880 MHz Receive |
| PCS (US) | Cellular Phone voice and data | 1850 to 1910 MHz Transmit 930 to 1990 MHz Receive |
| UMTS (non-US) | Cellular Phone voice and data | 1920 to 1980 MHz Transmit 2110 to 2170 MHz Receive |
| ISM (worldwide) | Fixed data links, with transmit and receive at the same frequencies. | Portions of 902 to 928 MHz, 2400 to 2500 MHz (ISM b/g), & 5000 to 6000 MHz (ISM a) |

SUMMARY

The present invention provides a cellular handset to require only a single antenna for transceiving between multiple frequency bands. The antenna connects to a modular frequency division filter that includes two or three transmission paths. Each transmission path includes either a band pass filter or a duplexer to separate the received signal by frequency. Frequency phase shifters or shunt inductors may be included to further enhance the frequency separation. Following frequency separating the separated signal is transceived by a device operating at the respective separated frequency.

In a three-frequency band embodiment, the modular frequency division filter includes three transmission paths. Each transmission path includes a band pass filter. The first band pass filter operates in the PCS band. The second band pass filter operates in the Cellular Band. The third band pass filter passes a third frequency band, e.g. GPS, ISMa, or ISMb/g. This would be refered to as a triplexer.

One of the three transmission paths could lead instead to a duplexer, resulting in a form of the four-frequency embodiment, or quadriplexer. Two could be duplexers, resulting in a form of the five-frequency embodiment, or quintplexer. Three could be duplexers, resulting in a form of the six-frequency embodiment. Alternately, one could be a triplexer, resulting in a form of the four-frequency embodiment. This process can be applied recursively.

In a four-frequency band embodiment, the modular frequency division filter includes two transmission paths. Each of the transmission paths include a duplexer. The first duplexer receives the receiving frequency for the PCS band and transmits the transmitting frequency for the PCS band. The second duplexer receives the receiving frequency for the Cellular Band and transmits the transmitting frequency for the Cellular Band, for instance.

One of the transmission paths could lead to a triplexer, resulting in a form of the five-frequency embodiment. To illustrate, in a five-frequency band embodiment, the modular frequency division filter includes three transmission paths. Two of the transmission paths include duplexers. The first duplexer receives the receiving frequency for the PCS band and transmits the transmitting frequency for the PCS band. The second duplexer receives the receiving frequency for the Cellular Band and transmits the transmitting frequency for the Cellular Band. The third transmission path includes a band pass filter. The band pass filter passes a fifth frequency band, e.g. GPS(1575 MHz), ISMa, or ISMb/g.

BRIEF DESCRIPTION OF THE DRAWINGS

FIGS. 1a–e illustrate prior art duplexers.

FIG. 10 illustrates the filter response of the quintplexer shown in FIG. 9a.

FIG. 10 illustrates the filter response of a quintplexer as shown in the present invention.

DETAILED DESCRIPTION

Figure 3B:
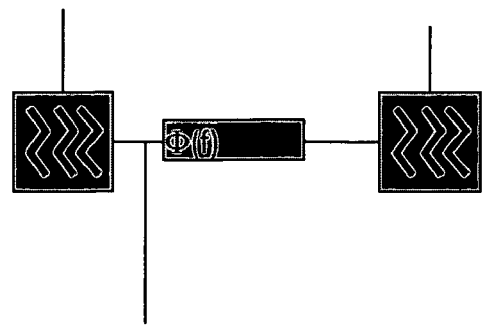
FIGS. 3a and 3b illustrate embodiments of the filter section shown in FIG. 2.

When two band pass filters (e.g. filter A and filter B) are connected to a common node, for each filter, its respective band pass response and its response in the band pass of the other filter must be considered. To illustrate, when filter A passes band A, the characteristic impedance at band B must be considered. Conversely, when filter B passes band B, its characteristic impedance at band A must be considered.

In combination, the response of filter A in band A is a function of both filter A and filter B in band A. Filter B exhibits a complex impedance having a resistive component and a reactive (either a capacitor or inductor like) component in the band pass frequency of filter A. The less loss exhibited, the more that the reactive component can be transformed, the less loss the combination itself will contribute.

FIG. 1 illustrates a duplexer form of the prior art. If filter B in band pass A behaves as an open circuit, the filters can be connected without any effect on band A. If a short circuit, a phase shift of 90° can be introduced to rotate the short into an open. If only close to a short circuit, then a phase shift of more or less than 90° would be required. If filter B looks like a capacitor in Band A, then a shunt inductor can resonate out this capacitance. If filter B looks like an inductor in Band A, then a shunt capacitor can resonate out this inductance. Similarly, the impedance of filter A in Band B can be modified appropriately using these techniques.

The present invention is a modular frequency division filter having an antenna port that connects to two or three transmission paths. Each transmission path includes either a band pass filter or a duplexer to separate the received signal by frequency. Frequency phase shifters or shunt inductors may be included to further enhance the frequency separation. Following frequency separation, the separated signal is transceived by a device operating at the respective separated frequency.

Similar techniques can be used to form a triplexer. Now, there are three frequency bands, and three filters that are joined to a common node. Each pass band is affected by the filter that passes this band as well as the two filters that reject it. Using combinations of the above techniques will allow for this joining. With three, or more, filters, the resistive nature of the filters becomes even more important. This technique is generalized in this disclosure.

In a three-frequency band embodiment, the filter block includes three transmission paths. Each transmission path includes a band pass filter. The first band pass filter operates in the PCS band. The second band pass filter operates in the Cellular Band. The third band pass filter passes a third frequency band, e.g. GPS, ISMa, or ISMb.

In a four-frequency band embodiment, the filter block includes two transmission paths. Two of the transmission paths include duplexers. The first duplexer receives the receiving frequency for the PCS band and transmits the transmitting frequency for the PCS band. The second duplexer receives the receiving frequency for the Cellular Band and transmits the transmitting frequency for the Cellular Band.

In a five-frequency band embodiment, the filter block includes three transmission paths. Two of the transmission paths include duplexers. The first duplexer receives the receiving frequency for the PCS band and transmits the transmitting frequency for the PCS band. The second duplexer receives the receiving frequency for the Cellular Band and transmits the transmitting frequency for the Cellular Band. The third transmission path includes a band pass filter. The band pass filter passes a fifth frequency band, e.g. GPS (1575 MHz), ISM 2.4 (Bluetooth 802.11b/g), or ISM 5.6 Bluetooth 802.11a).

A cellular handset including a modular frequency division filter supports simultaneous service for different frequency ranges and different wireless standards.

Figure 2:
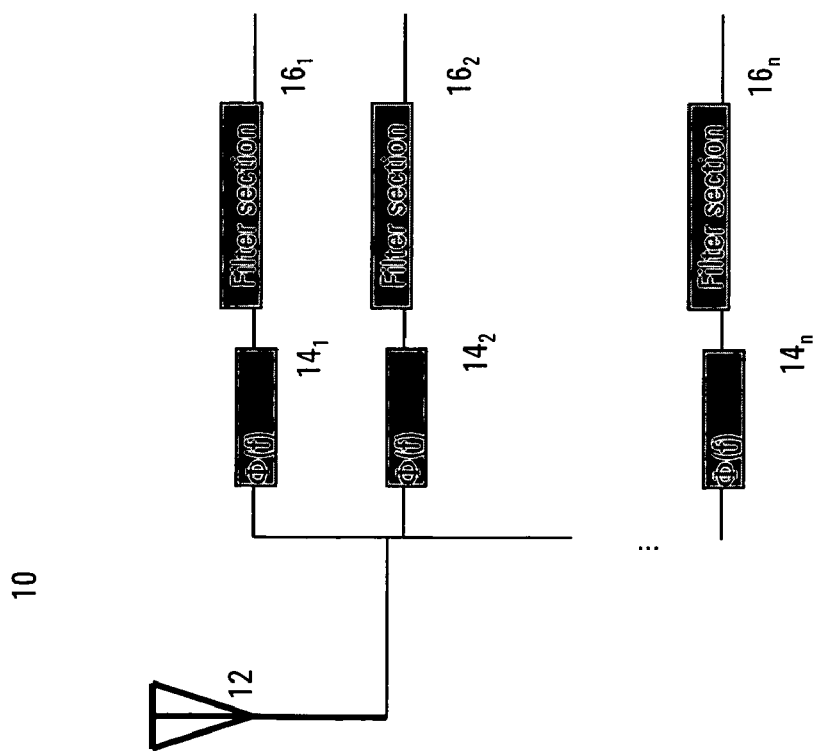
FIG. 2 an embodiment of the present invention.

FIG. 2 illustrates a functional block diagram (10) according to the present invention. An antenna terminal (12) is connected to N frequency phase shifters ($14_1, 14_2, \ldots 14_N$). Each frequency phase shifter ($14_1, 14_2, \ldots 14_N$) connects to a filter section ($16_1, 16_2, \ldots 16_N$). The frequency phase shifters are optional.

Figure 3A:
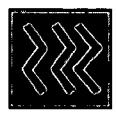
Figure 4:
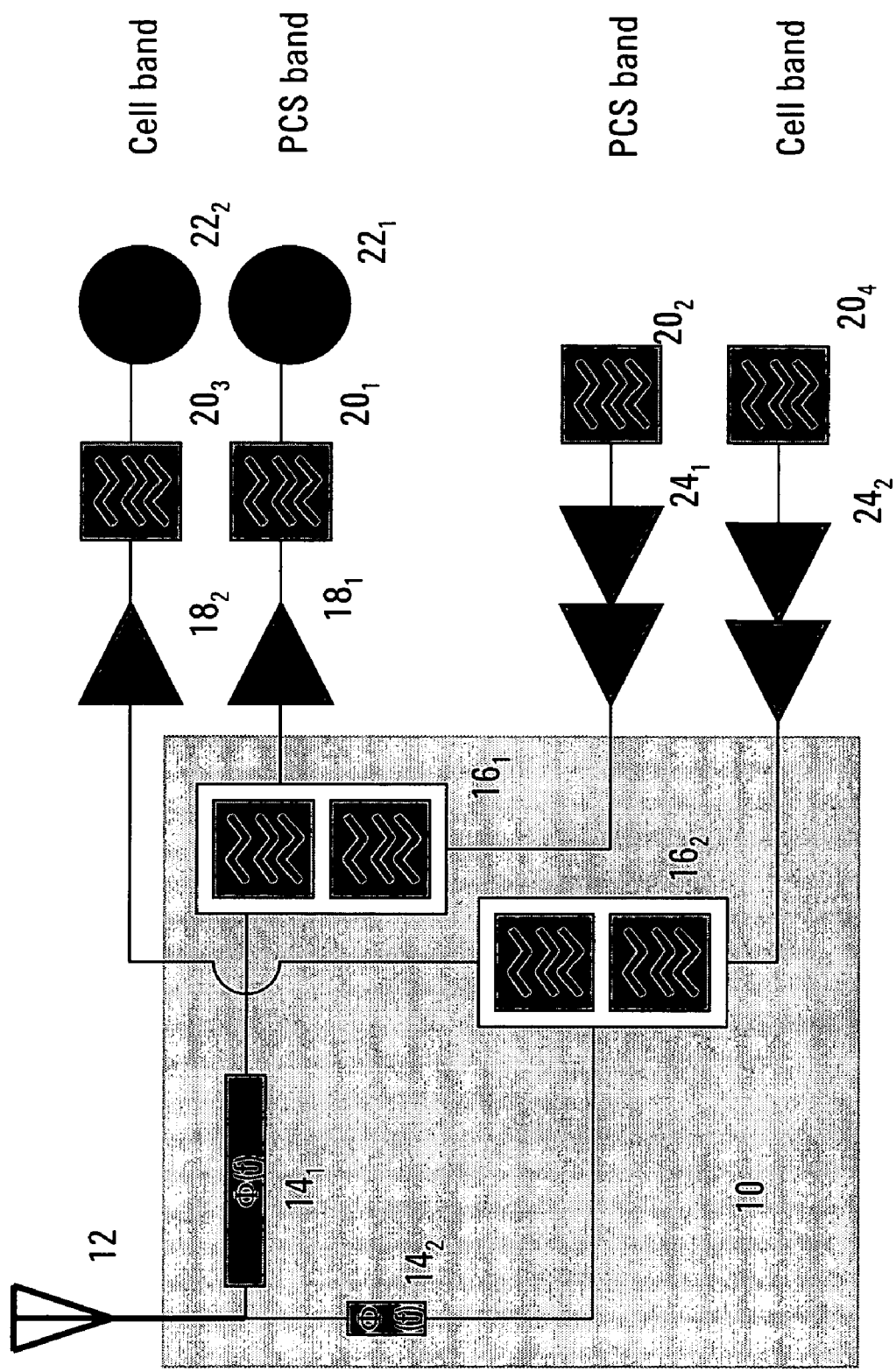
FIG. 4 illustrates a quadriplexer embodiment of the present invention.

FIGS. 3a and 3b illustrate embodiments of the filter section shown in FIG. 4. FIG. 3a illustrates a band pass filter. FIG. 3b illustrates a duplexer. In this illustration, the duplexer uses film bulk acoustic resonators.

FIG. 4 illustrates a handset using a quadriplexer embodiment of the present invention according to FIG. 2. Within the modular frequency division filter (10), each filter section ($16_1, 16_2$) is a duplexer. The first duplexer ($16_1$) passes the receiving and transmitting frequencies of the PCS Band. The PCS Band reception path includes a low noise amplifier ($18_1$), band pass filter ($20_1$), and a mixer ($22_1$). The PCS band transmission path includes a band pass filter ($20_2$) and a power amplifier ($24_1$). The second duplexer ($16_2$) passes the receiving and transmitting frequencies of the Cell Band. The Cell Band reception path includes a low noise amplifier ($18_2$), band pass filter ($20_3$), and a mixer ($22_2$). The Cell band transmission path includes a band pass filter ($20_4$) and a power amplifier ($24_2$).

Figure 5:
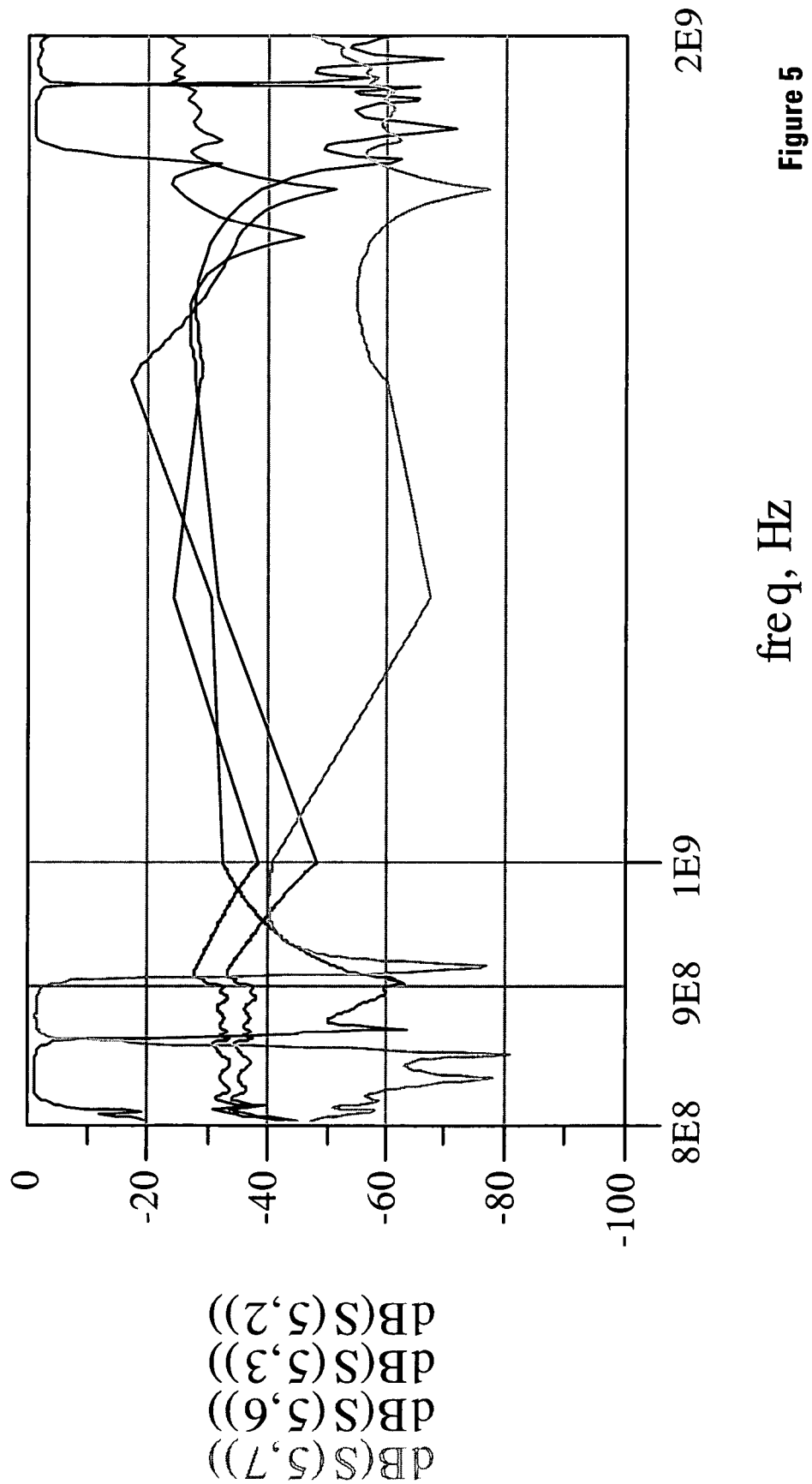
FIG. 5 illustrates the filter response of the quadriplexer shown in FIG. 4.

FIG. 5 illustrates the filter response of the quadriplexer shown in FIG. 4.

Figure 6:
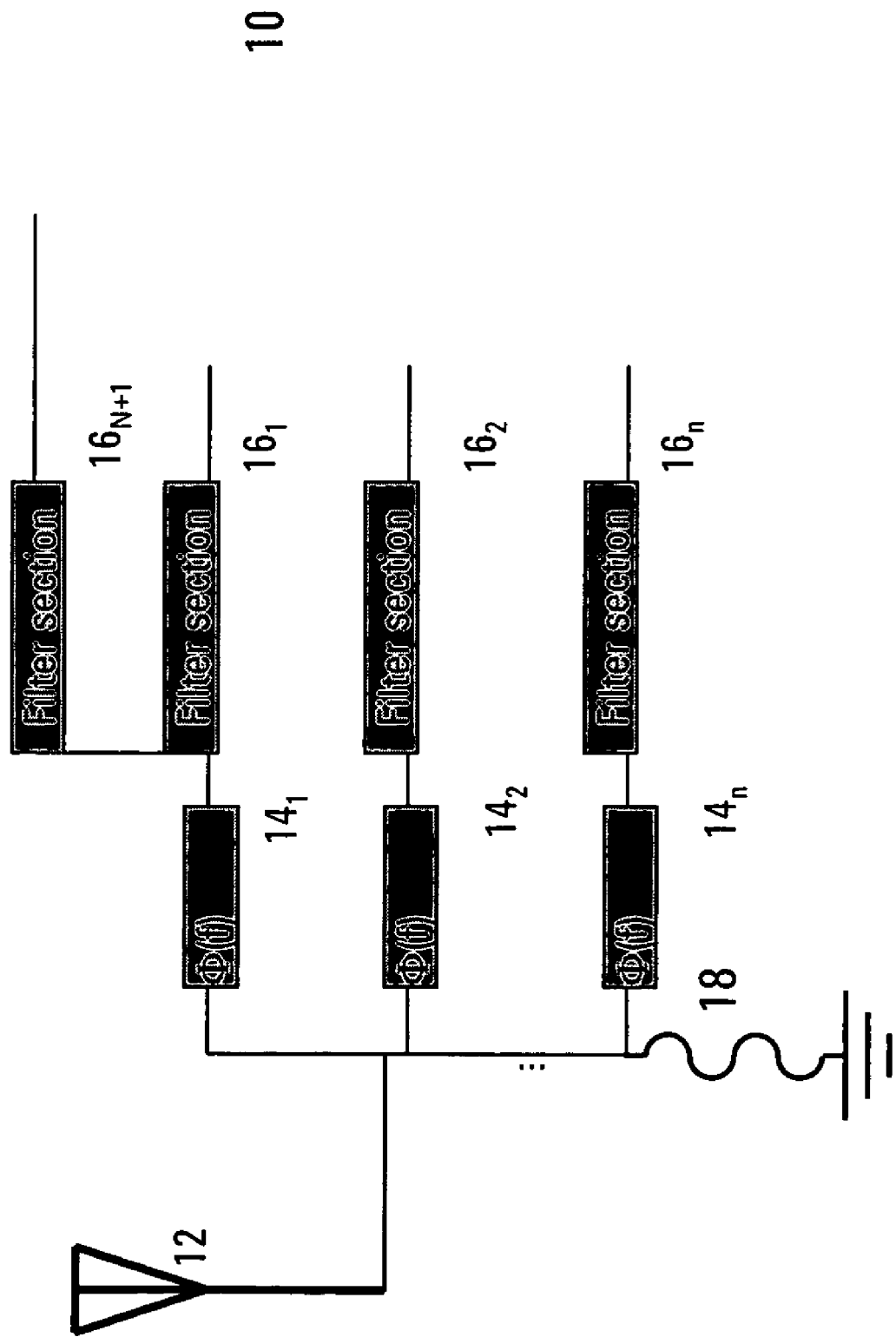
FIG. 6 illustrates another functional block diagram according to the present invention.
Figure 7A:
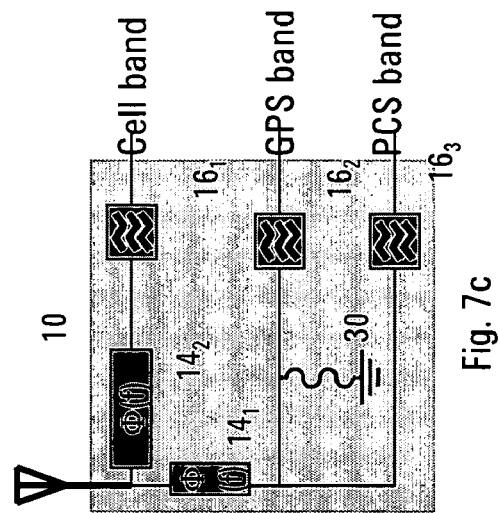
FIGS. 7a–f illustrate triplexer embodiments of the present invention.
Figure 7B:
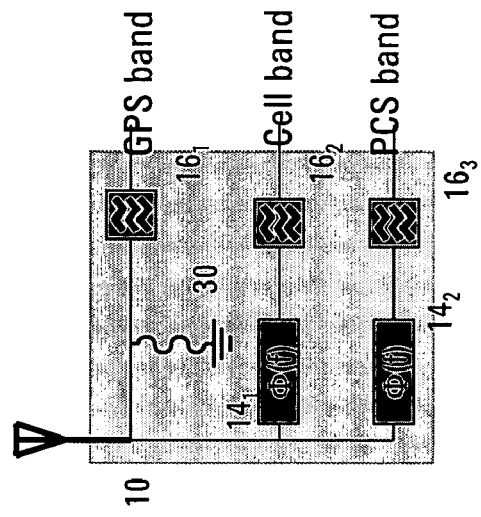
Figure 7C:
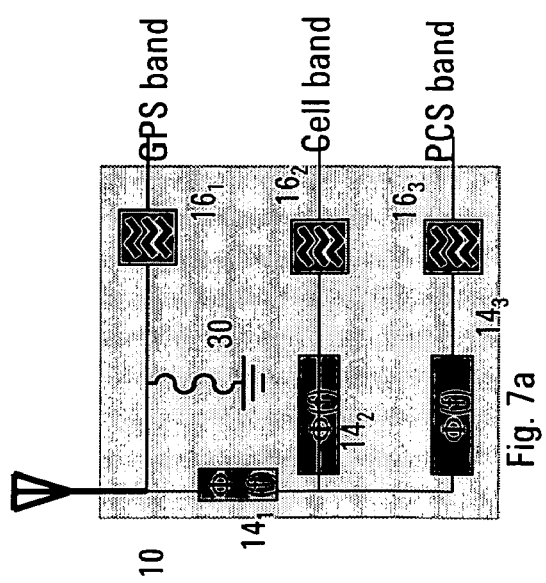
Figure 7D:
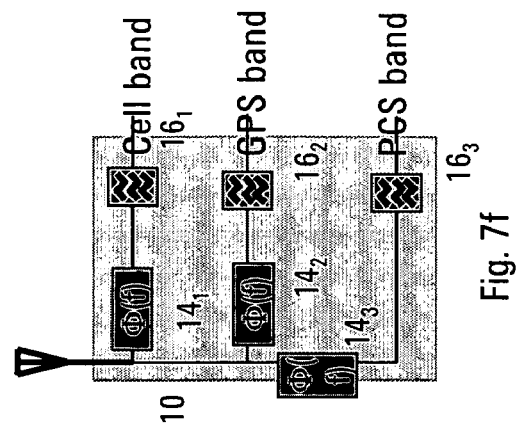
Figure 7E:
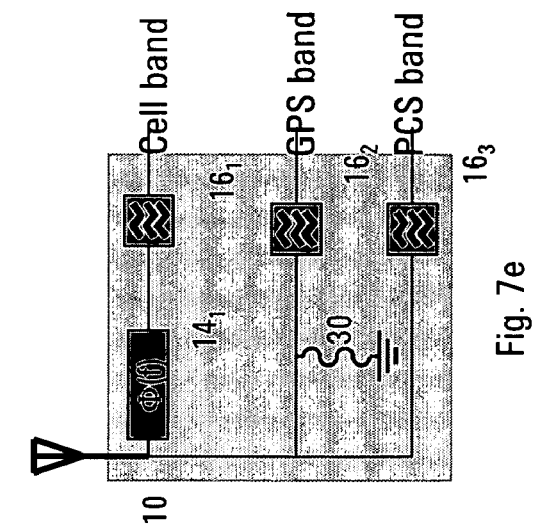
Figure 7F:
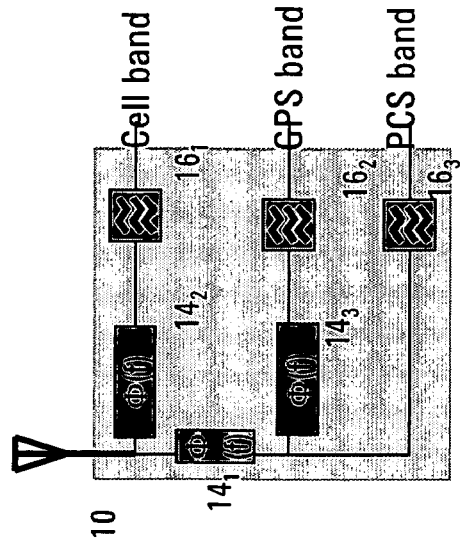

FIG. 6 illustrates another functional block diagram according to the present invention. The antenna terminal (12) is connected to the first and second frequency phase shifters ($14_1, 14_2, \ldots 14_N$). Each frequency phase shifter ($14_1, 14_2, \ldots 14_N$) connects to a filter section ($16_1, 16_2, \ldots 16_N$). An additional filter section ($16_{N+1}$) connects to the first frequency phase shifter output. An optional inductor (30) connects between the antenna terminal (12) and ground. The frequency phase shifters are optional.

FIGS. 7a–f illustrates handsets using triplexer embodiments of the present invention according to FIG. 6. For each embodiment, each of the three filter sections is a bandpass filter.

Figure 8:
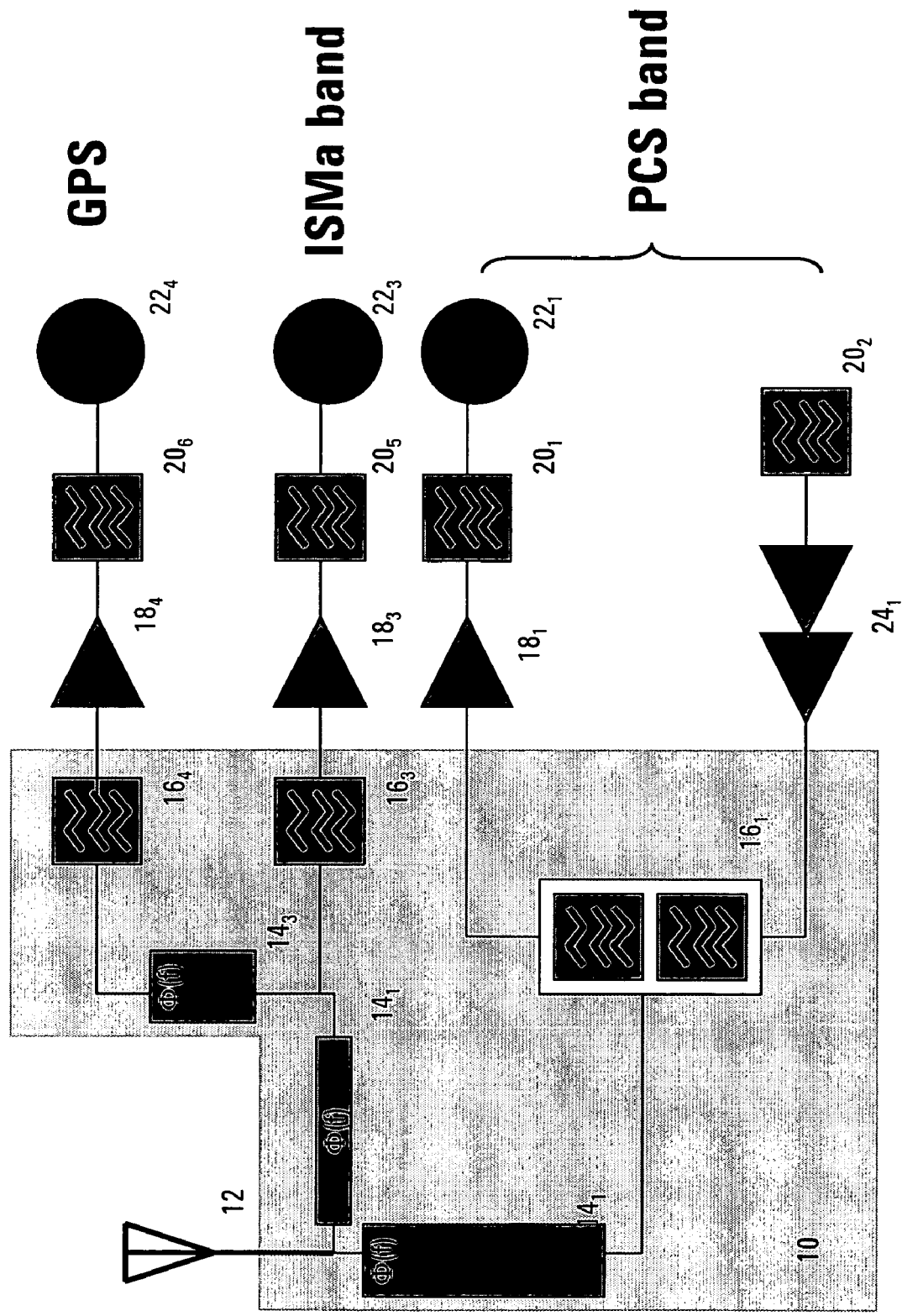
FIG. 8 illustrates a quadriplexer embodiment of the present invention.

FIG. 8 illustrates a handset using a quadriplexer embodiment of the present invention according to FIG. 6. The modular frequency division filter (10) includes three filter sections. An optional frequency phase shifter ($14_3$) connects between the first and third filter sections.

The first filter section ($16_1$) is a duplexer. The first duplexer ($16_1$) passes the receiving and transmitting frequencies of the PCS Band. The PCS Band reception path includes a low noise amplifier ($18_1$), a band pass filter ($20_1$), and a mixer ($22_1$). The PCS band transmission path includes a band pass filter ($20_2$) and a power amplifier ($24_1$). The second filter section ($16_2$) is band pass filter that passes the ISMa band. The ISMa band transmission path includes a low noise amplifier ($18_3$), a band pass filter ($20_5$), and a mixer ($20_3$). The third filter section ($16_3$) is band pass filter that passes the GPS band. The GPS band transmission path includes a low noise amplifier ($18_4$), a band pass filter ($20_6$), and a mixer ($22_4$). Two duplexers are used because the PCS and Cellular Bands are separated by at least 50% of the bandwidth.

Figure 9A:
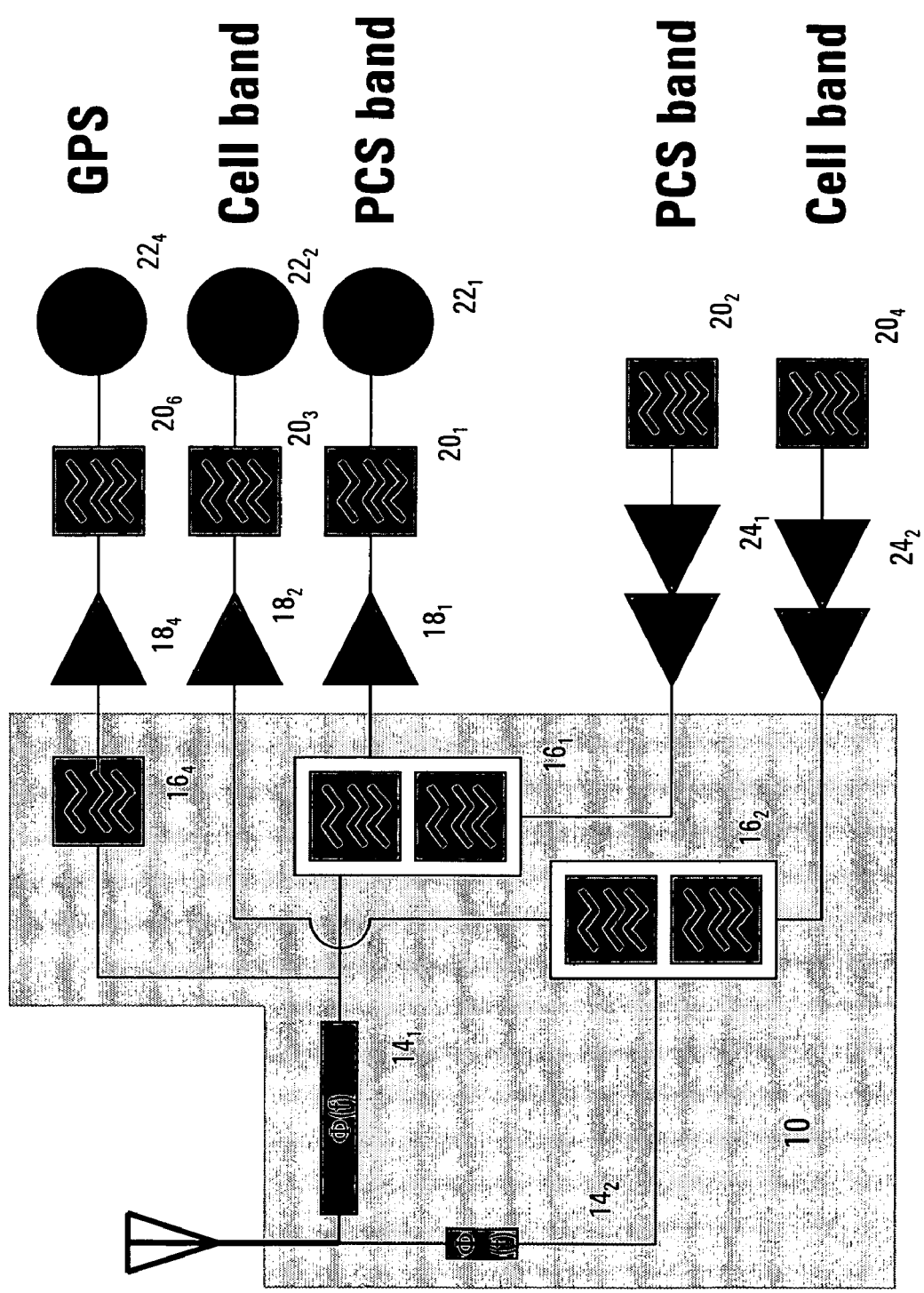
FIGS. 9a and 9b illustrate quintplexer embodiments of the present invention.
Figure 9B:
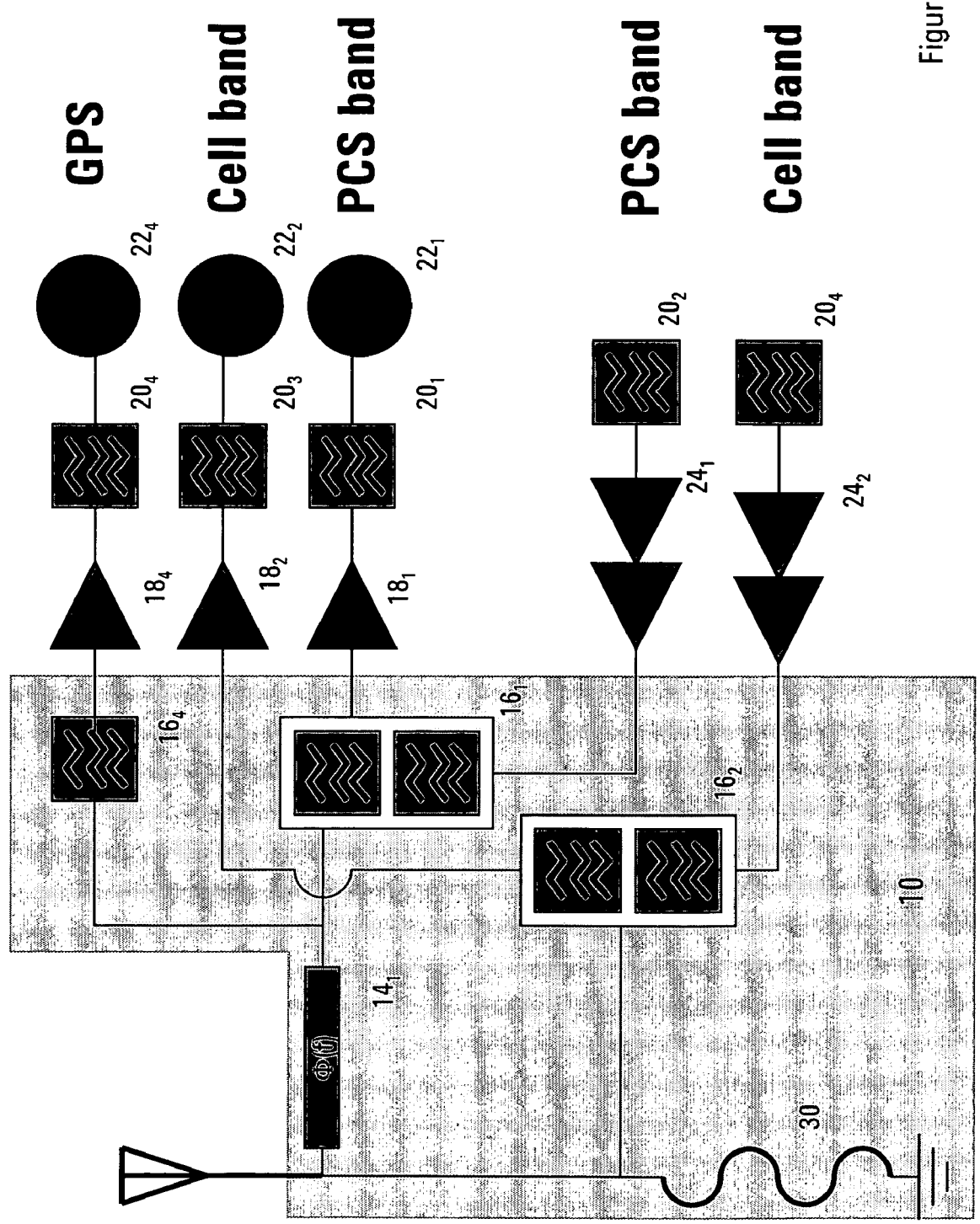

FIGS. 9a and 9b illustrates a handset using quintplexer embodiments of the present invention according to FIG. 6.

The modular frequency division filter (10) shown in FIG. 8a includes 3 filter sections. The first filter section is a duplexer ($16_1$) passes the receiving and transmitting frequencies of the PCS Band. The PCS Band reception path includes a low noise amplifier ($18_1$), band pass filter ($20_1$), and a mixer ($22_1$). The PCS band transmission path includes a band pass filter ($20_2$) and a power amplifier ($24_1$). The second filter section is a duplexer ($16_2$) passes the receiving and transmitting frequencies of the Cell Band. The Cell Band reception path includes a low noise amplifier ($18_2$), band pass filter ($20_3$), and a mixer ($22_2$). The Cell band transmission path includes a band pass filter ($20_4$) and a power amplifier ($24_2$). The GPS band transmission path includes a low noise amplifier ($18_4$), a band pass filter ($20_6$), and a mixer ($22_4$).

In FIG. 9b, a shunt inductor 30 is used in place of the second frequency phase shifter $14_2$.

In both embodiments, two duplexers are used because the PCS and Cellular Bands are separated by at least 50% of the bandwidth. However, a band pass filter is used to separate the GPS frequency because it is within 10–50% of the PCS band.

Figure 10:
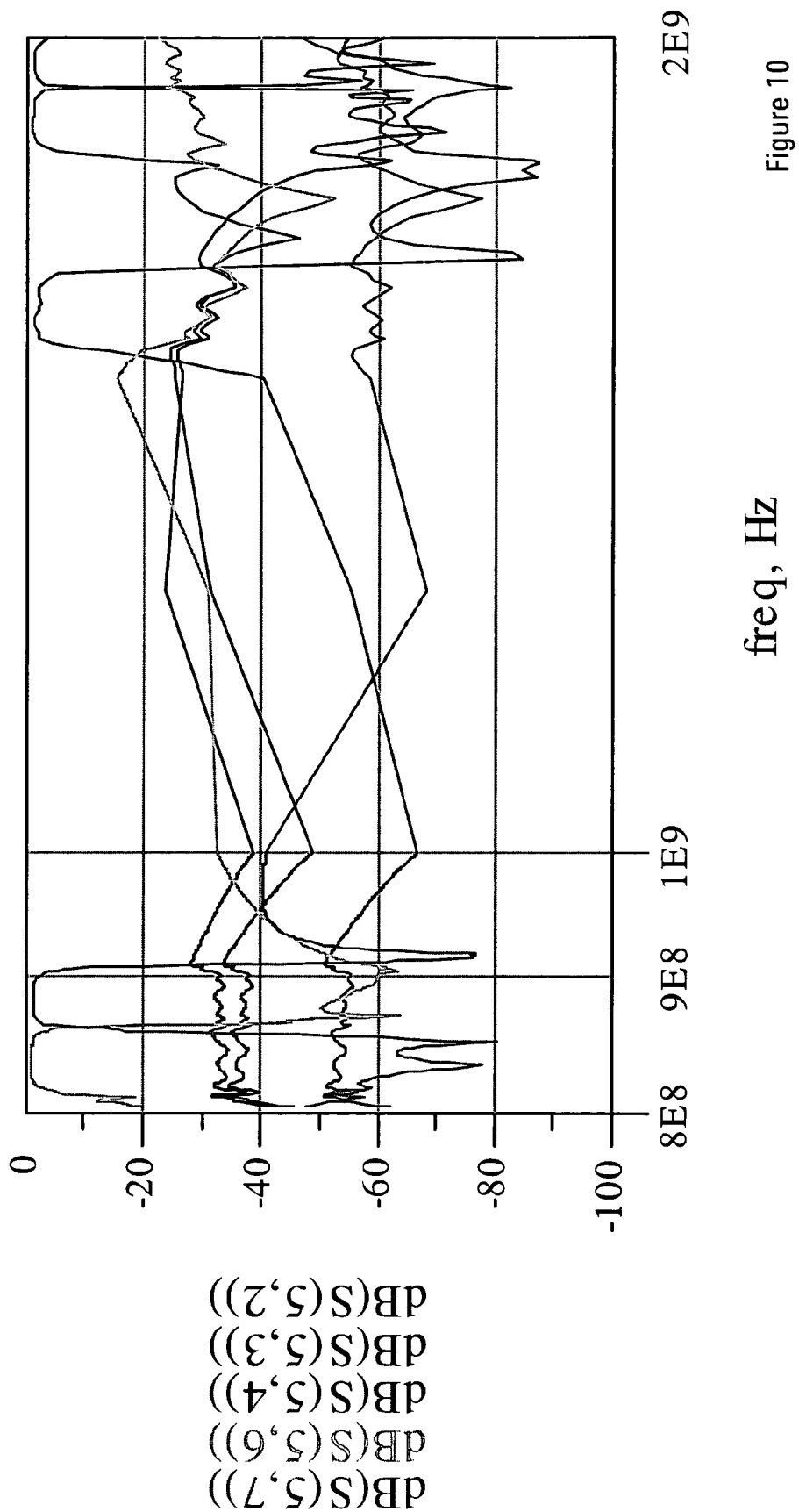

FIG. 10 illustrates the filter response of a quintplexer as shown in the present invention.

Figure 11:
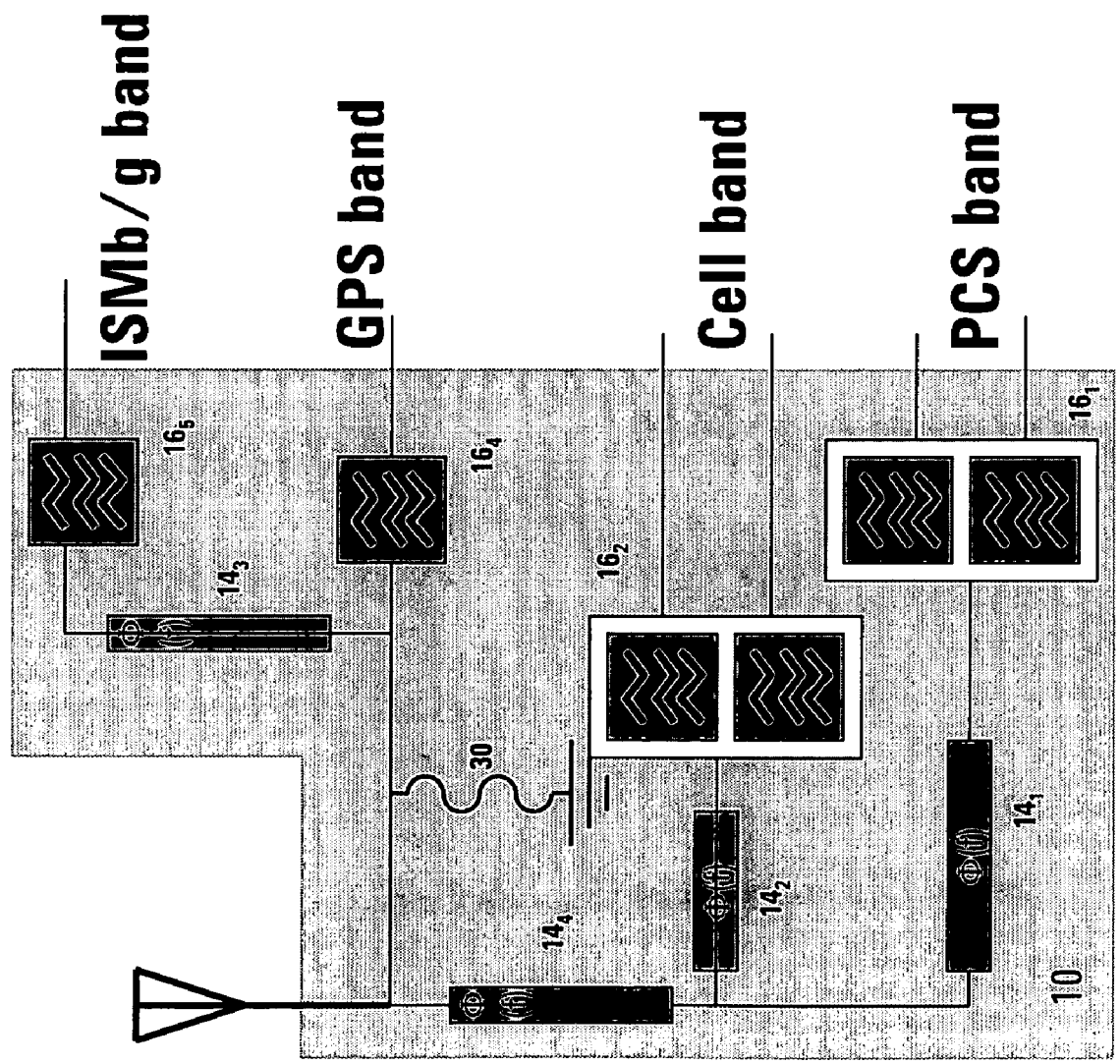
FIG. 11 illustrates a hexplexer embodiment of the present invention.

FIG. 11 illustrates a hexplexer embodiment of the present invention according to FIG. 6. The modular frequency division filter (10) includes 4 filter sections. The first filter section is a duplexer ($16_1$) passes the receiving and transmitting frequencies of the PCS Band. The second filter section is a duplexer ($16_2$) passes the receiving and transmitting frequencies of the Cell Band. The third filter section ($16_4$) is band pass filter that passes the GPS band. The fourth filter section ($16_5$) is band pass filter that passes the ISMb/g band.

Figure 12:
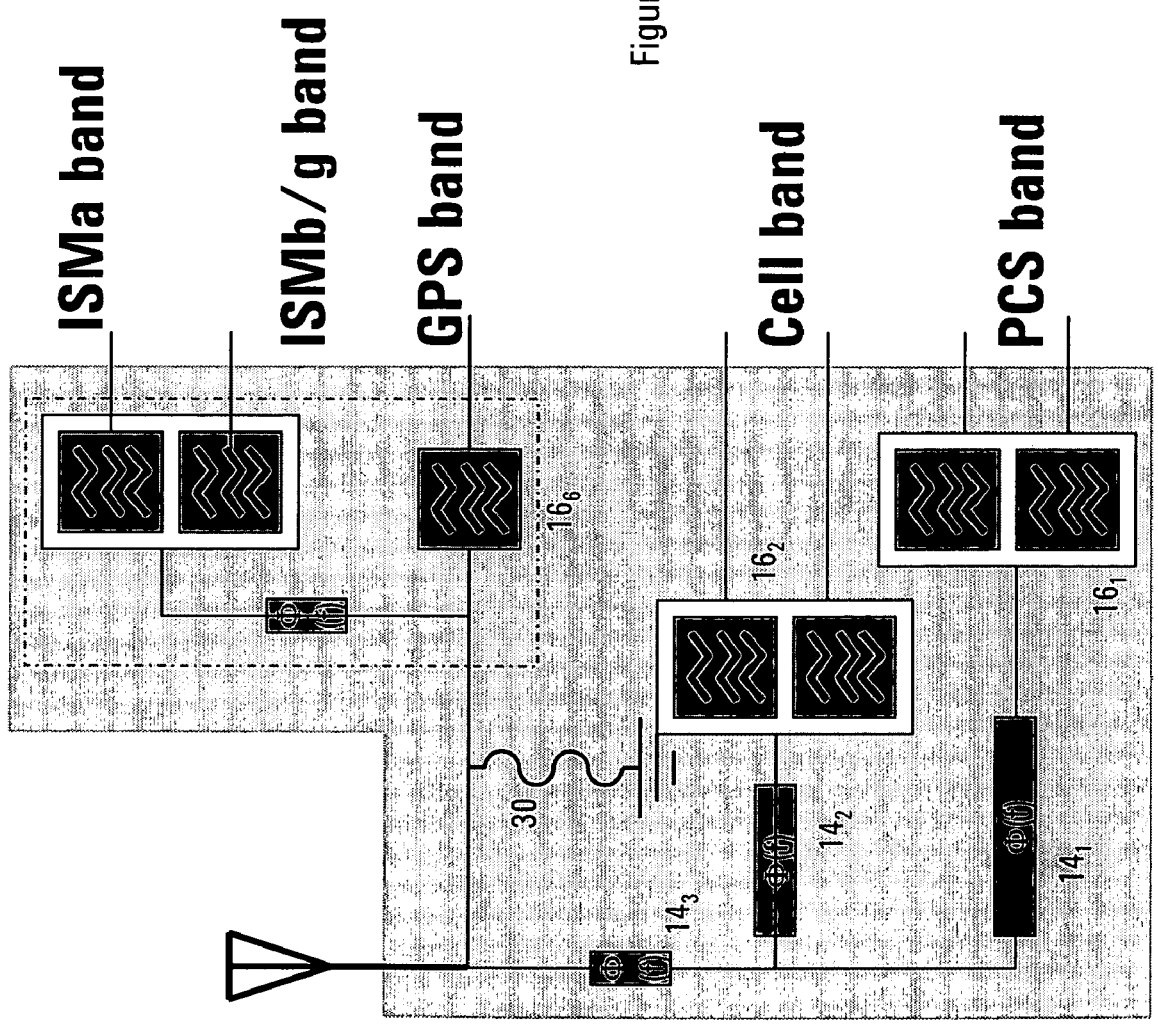
FIG. 12 illustrates a septplexer embodiment.

This concept can be extended recursively by one with skill in the art as exhibited in FIG. 12. The modular frequency division filter (10) includes 3 filter sections. The first filter section is a duplexer ($16_1$) that passes the receiving and transmitting frequencies of the PCS Band. The second filter section is a duplexer ($16_2$) that passes the receiving and transmitting frequencies of the Cell Band. The third filter section is a triplexer (16.sub.6) that passes the GPS, ISMa, ISMb/g bands.

The triplexer is of the form shown in FIG. 6.

We claim:

1. A modular filter comprising:
an antenna port;
N transmission paths, connecting to the anntenna port, where $N \geq 2$, the Nth transmission path including a duplexer, the N−1 transmission paths each include a filter section selected from a group comprising band pass filters, duplexers, and triplexers, wherein for each of the N−1 transmission paths, the filter section includes film bulk acoustic resonators, and wherein N=2, for the N−1 transmission path, the filter section is a duplexer, each transmission path including a frequency phase shifter, connected to the antenna port, having an output connected to the respective duplexer, and further including a frequency phase shifter serially connected to a band pass filter and the antenna port.

2. A modular filter, as defined in claim 1, wherein the duplexers separate frequency bands that are separated by at least 50% of bandwith, for each duplexer, the separated frequency bands are further separated by less than 10% of bandwidth.

3. A modular filter, as defined in claim 1, further including a band pass filter connected to the frequency phase shifter output of one of the N transmission paths, wherein the band pass filter and the duplexer of the one of the N transmission paths separate frequency bands that are separated by 10–50% of bandwidth.

4. A modular filter comprising:
an antenna port;
N transmission paths, connecting to the antenna port, where $N \geq 3$, each transmission path includes a filter section selected from a group including band pass filters, duplexers, and triplexers, where N=3, at least one of the N transmission paths including a shunt inductor connected to the antenna port and ground.

5. A modular filter, as defined in claim 4, for each of the N transmission paths, the filter section includes film bulk acoustic resonators.

6. A modular filter, as defined in claim 5, where N=3, at least one of the N transmission paths including a frequency phase shifter, connected to the antenna port, having an output connected to the respective filter section.

7. A modular filter, as defined in claim 6, further including a shunt inductor connected to the antenna port and ground.

8. A modular filter, as defined in claim 7, further including a frequency phase shifter interposing the inputs of two adjacent transmission paths.

9. A handset supporting different frequency bands comprising:
an antenna transceiving a signal; and
a modular filter having an input connected to the antenna, including, N transmission paths, connecting to the input, where $N \geq 2$, the Nth transmission path including a duplexer, the N−1 transmission paths each including a filter section selected from a group including band pass filters, duplexers, and triplexers, each of the N−1 transmission paths include film bulk acoustic resonators in the filter section, wherein N=2, for the N=1 transmission path, the filter section including a duplexer, each transmission path including a frequency phase shifter, connected to the antenna port, having an output connected to the respective duplexer, wherein the duplexers separate frequency bands that are separated by at least 50% of bandwidth, for each duplexer, the separated frequency bands are further separated by less than 10% of bandwidth and further including a frequency phase shifter serially connected to a band pass filter and the antenna port.

10. A handset, as defined in claim 9, further including a band pass filter connected to the frequency phase shifter output of one of the N transmission paths, wherein the band pass filter and the duplexer of the one of the N transmission paths separate frequency bands that are separated by 10–50% of bandwidth.

11. A handset supporting different frequency bands comprising:
an antenna transceiving a signal; and
a modular filter having an input connected to the antenna, including, N transmission paths, connecting to the antenna port, where $N \geq 3$ each transmission path including a filter section selected from a group comprising band pass filters, duplexers, and triplexers, wherein for each of the N transmission paths, the filter section includes film bulk acoustic resonators, where N=3, at least one of the N transmission paths including a duplexer or a bandpass filter and a frequency phase shifter, connected to the antenna port, having an output connected to the respective one of the duplexer and band pass filter and further including a shunt inductor connected to the antenna port and ground.

12. A handset, as defined in claim 11, further including a frequency phase shifter interposing the inputs of two adjacent transmission paths.

* * * * *